United States Patent
Bank et al.

(10) Patent No.: US 11,537,107 B2
(45) Date of Patent: Dec. 27, 2022

(54) AUTONOMOUS MOBILE ROBOTS FOR MOVABLE PRODUCTION SYSTEMS

(71) Applicants: Hasan Sinan Bank, Princeton, NJ (US); Rizwan Majeed, Kendall Park, NJ (US)

(72) Inventors: Hasan Sinan Bank, Princeton, NJ (US); Rizwan Majeed, Kendall Park, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 420 days.

(21) Appl. No.: 16/104,560

(22) Filed: Aug. 17, 2018

(65) Prior Publication Data
US 2020/0057431 A1    Feb. 20, 2020

Related U.S. Application Data

(60) Provisional application No. 62/569,749, filed on Oct. 9, 2017.

(51) Int. Cl.
*G06F 17/00*     (2019.01)
*G05B 19/418*   (2006.01)
(Continued)

(52) U.S. Cl.
CPC ...... *G05B 19/41815* (2013.01); *A01B 69/001* (2013.01); *B25J 9/1653* (2013.01);
(Continued)

(58) Field of Classification Search
CPC ........ G05B 19/41815; G05B 19/41895; G05B 19/4183; G05B 2219/45106;
(Continued)

(56) References Cited

U.S. PATENT DOCUMENTS 4,779,378 A * 10/1988 Mason, Jr. ............. A01G 9/023
                                                              47/83
9,271,454 B1 * 3/2016 Shochat ............ H04N 5/23206
(Continued)

FOREIGN PATENT DOCUMENTS

CN    204634505 U    9/2015
CN    106276009 A    1/2017
(Continued)

OTHER PUBLICATIONS

Learn How to Use a Dolly With These Helpful Hints | Hevi-Haul (Year: 2015).*
(Continued)

*Primary Examiner* — Harry Y Oh
*Assistant Examiner* — Sohana Tanju Khayer

(57) ABSTRACT

A system for performing autonomous agriculture within an agriculture production environment includes one or more agriculture pods, a stationary robot system, and one or more mobile robots. The agriculture pods include one or more plants and one or more sensor modules for monitoring the plants. The stationary robot system collects sensor data from the sensor modules, performs farming operations on the plants according to an operation schedule based on the collected sensor data, and generates a set of instruction for transporting the agriculture pods within the agriculture production environment. The stationary robot system communicates the set of instructions to the agriculture pods. The mobile robots transport the agriculture pods between the stationary robot system and one or more other locations within the agriculture production environment according to the set of instructions.

19 Claims, 12 Drawing Sheets

(51) Int. Cl.
  *G05D 1/00* (2006.01)
  *G05D 1/02* (2020.01)
  *B25J 9/16* (2006.01)
  *A01B 69/00* (2006.01)

(52) U.S. Cl.
  CPC .......... *B25J 9/1669* (2013.01); *B25J 9/1697* (2013.01); *G05B 19/4183* (2013.01); *G05B 19/41895* (2013.01); *G05D 1/0088* (2013.01); *G05D 1/028* (2013.01); *G05B 2219/45017* (2013.01); *G05B 2219/45106* (2013.01); *G05D 2201/0201* (2013.01)

(58) Field of Classification Search
  CPC ....... G05B 2219/45017; G05D 1/0088; G05D 1/028; G05D 2201/0201; G05D 1/0246; B25J 9/1653; B25J 9/1669; B25J 9/1697; A01B 69/001; Y02P 90/60
  See application file for complete search history.

(56) References Cited

U.S. PATENT DOCUMENTS

| | | | | |
|---|---|---|---|---|
| 9,764,675 | B1* | 9/2017 | Theobald | B66C 1/22 |
| 10,131,051 | B1* | 11/2018 | Goyal | B25J 9/1697 |
| 2002/0088173 | A1* | 7/2002 | Hessel | A01C 11/02 47/60 |
| 2004/0030606 | A1* | 2/2004 | Park | A01G 27/003 700/284 |
| 2009/0077876 | A1* | 3/2009 | Eghbal | A01G 9/0297 47/18 |
| 2009/0214324 | A1 | 8/2009 | Grinnell | |
| 2010/0291620 | A1* | 11/2010 | Abrams | C10L 5/363 435/41 |
| 2013/0110341 | A1* | 5/2013 | Jones | G05D 1/0287 701/23 |
| 2014/0053462 | A1* | 2/2014 | Wei | G05B 19/4183 47/58.1 R |
| 2014/0100690 | A1* | 4/2014 | Wurman | G05B 19/41895 700/230 |
| 2014/0208647 | A1* | 7/2014 | Carpenter | A01G 9/023 47/66.7 |
| 2014/0258173 | A1* | 9/2014 | Blanchard | G06Q 10/067 705/348 |
| 2015/0223416 | A1* | 8/2015 | Eng | G05B 15/02 700/284 |
| 2016/0167228 | A1* | 6/2016 | Wellman | B25J 9/1602 901/3 |
| 2017/0030877 | A1* | 2/2017 | Miresmailli | G06N 5/04 |
| 2017/0293294 | A1* | 10/2017 | Atchley | B66F 9/187 |
| 2018/0168141 | A1* | 6/2018 | Tanner | B25J 9/1679 |

FOREIGN PATENT DOCUMENTS

| | | | |
|---|---|---|---|
| CN | 106547261 | A | 3/2017 |
| CN | 106900399 | A | 6/2017 |
| CN | 206302832 | U | 7/2017 |
| CN | 107140574 | A | 9/2017 |
| EP | 2708331 | A1 | 3/2014 |
| EP | 3568748 | A1 | 11/2019 |
| JP | 2004298068 | A | 10/2004 |
| JP | 2011200166 | A | 10/2011 |
| JP | 2013230088 | A | 11/2013 |
| JP | 2015053927 | A * | 3/2015 |
| JP | 2015053927 | A | 3/2015 |
| WO | 2013066534 | A1 | 5/2013 |
| WO | 2016164652 | A1 | 10/2016 |
| WO | 20180132814 | A1 | 7/2018 |

OTHER PUBLICATIONS

EP Search Report dated Mar. 14, 2019; EP Application No. 18193383.9; Filing Date: Sep. 10, 2018; 16 pages.
Japanese Report on Office Action dated Sep. 9, 2019; JP Patent Application No.; 25 pages.
Examination Report dated Sep. 4, 2020; Application No. 201811113722.2; 18 pages.
European Communication under Rule 71(3) EPC; EP Application No. 18 193 383.9; 39 pages.
Von Hippel, Eric, Stefan Thomke, and Mary Sonnack. "Creating breakthroughs at 3M." Harvard business review (1999).
Harper, Caleb, and Mario Siller. "OpenAG: a globally distributed network of food computing." IEEE Pervasive Computing 14.4 (2015): 24-27.
Banerjee, Chirantan, and Lucie Adenaeuer. "Up, up and away! The economics of vertical farming." Journal of Agricultural Studies 2.1 (2014): 40-60.
Jayswal, Arpit, Mr ND Chauhan, and Mr Rahul Sen. "A Literature Review on Lean Manufacturing Techniques." (2017).
Shrouf, Foudi, Joaquin Ordieres, and Giovanni Miragliotta. "Smart factories in Industry 4.0: A review of the concept and of energy management approached in production based on the Internet of Things paradigm." Industrial Engineering and Engineering Management (IEEM), 2014 IEEE International Conference on. IEEE, 2014.
Guizzo, Eric. "Three engineers, hundreds of robots, one warehouse." IEEE spectrum 45.7 (2008): 26-34.
D'Andrea, Raffaello. "Guest editorial: A revolution in the warehouse: A retrospective on kiva systems and the grand challenges ahead." IEEE Transactions on Automation Science and Engineering 9.4 (2012): 638-639.
Decision of Rejection dated Nov. 1, 2021 corresponding to application No. 201811113722.2; 9 pages.

* cited by examiner

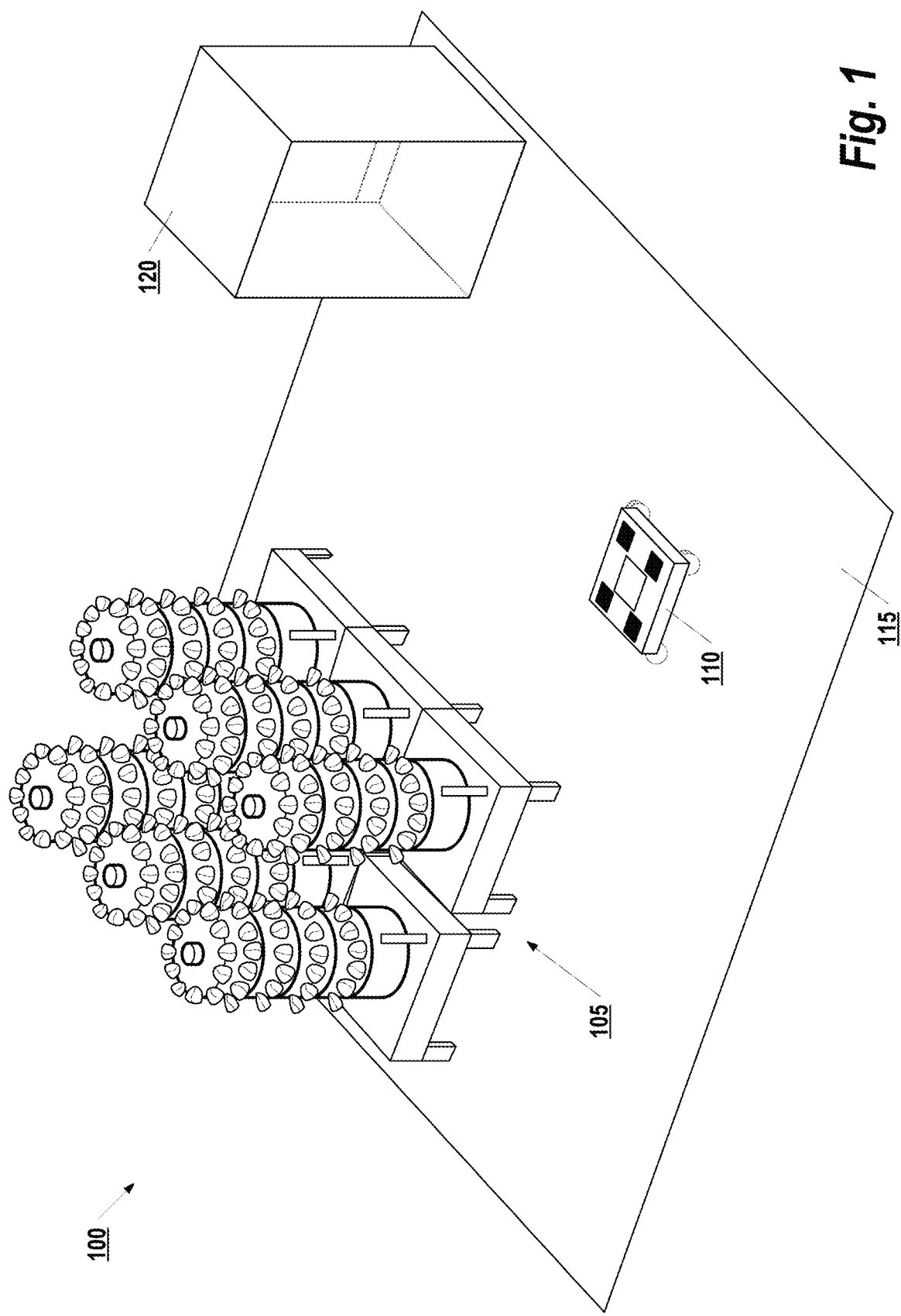

| | Area of plant | Occupied space on the land |
|---|---|---|
| Vertically Stacked | $a \times b \times n$ | $a \times b$ |
| Spiral | $\sqrt{4 \times \pi^2 \times r^2 + h^2 \left(\frac{\theta}{360}\right)}$ | $2 \times \pi \times r$ |
| Horizontally Stacked | $a \times b \times n$ | $h \times a$ (or b instead of a) |
| Pyramid | $b \times a + b \sqrt{\left(\frac{a}{2}\right)^2 \times h^2} +$ | $a \times b$ |
| Cylinder | $\pi \times r^2 \times h \times n$ | $2 \times \pi \times r$ |

*Fig. 2C*

|  | Vertically Stacked | Spiral | Horizontally Stacked | Pyramid | Cylinder Surface |
|---|---|---|---|---|---|
| Accessibility | ●●● | ●●●● | ●●● | ●●●● | ●●●● |
| Ergonomics | ●●● | ●●●● | ●●● | ●●●● | ●●●● |
| Seeding/ Harvesting | ●● | ●●● | ●●● | ●●● | ●●● |
| Watering/ Fertilizing | ●●● | ●●● | ●●● | ●●● | ●●● |
| Mobility | ●●● | ●●● | ●●●● | ●●●● | ●●●● |
| Manufacturability | ●●●● | ●●●● | ●●● | ●●●● | ●●●● |

*Fig. 2D*

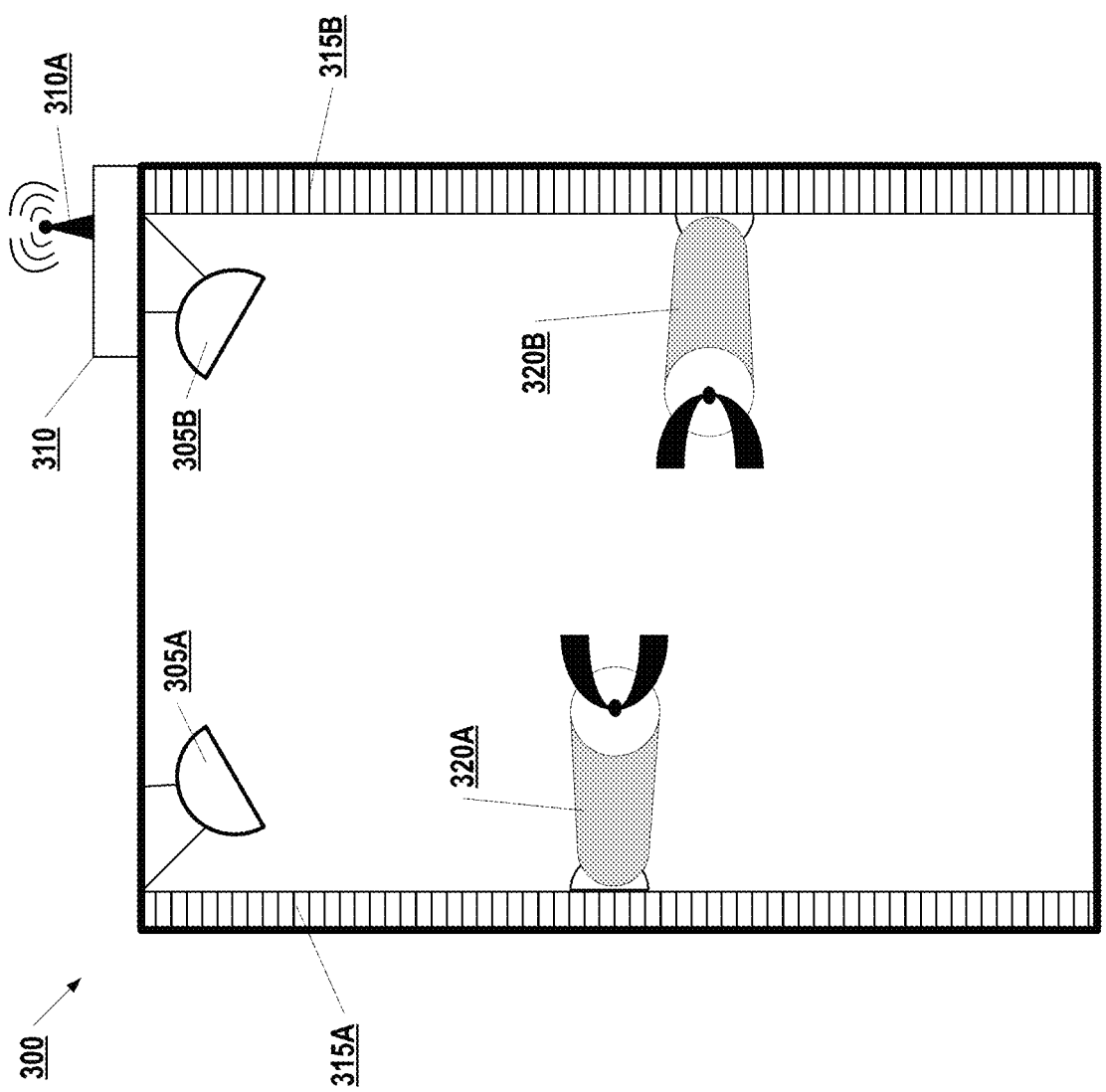

AUTONOMOUS MOBILE ROBOTS FOR MOVABLE PRODUCTION SYSTEMS

CROSS-REFERENCE TO RELATED APPLICATIONS

This application claims the benefit of U.S. Provisional Application Ser. No. 62/569,749 filed Oct. 9, 2017, which is incorporated herein by reference in its entirety.

TECHNICAL FIELD

The present disclosure relates generally to methods, systems, and apparatuses related to the use of autonomous mobile robots for movable production systems. The disclosed techniques may be applied to, for example, increase the efficiency of farming systems.

BACKGROUND

The practice of farming was traditionally practiced outdoors on large land parcels, and was subject to the weather conditions and other environmental factors present outdoors. In order to optimize the practice of farming, new techniques have been developed to increase the efficiencies of performing farming operations and the level of control that a farmer has over plants as they grow. One of the most popular of these techniques is vertical farming (VF). VF is the practice of growing produce in vertically stacked layers. VF is typically practiced using shelves suspended on a wall within a warehouse or other large structure.

Even though VF is more efficient than traditional farming practices, it is still resource-intensive. As one example, in order to feed 15,000 people with enough food, a vertical system should be 37 floors with 25 of these with crop production and 3 for aquaculture. This results in 0.93 ha (estimated 28 $m^2$) of intensively farmed indoor space to produce food to support a single individual in an extraterrestrial environment like a space station or colony supplying the person with about 3000 kcal of energy per day. In addition, VF typically uses one floor for the cleaning of growth trays, sowing, and germination, one for packing and processing the plants as well as fish; and another one for storage and delivery. This configuration requires a total building height of 167.5 meters, with a length (and width) of 44 meters (given the aspect ratio of 3.81—where the aspect ratio is the ratio of height of the structure to the width of its shape). Moreover, a typical VF configuration requires light, carbon dioxide and water to be supplied with "at-the-point" or "location-oriented" automation techniques. For example, electricity and plumbing must be installed throughout the facility to ensure that all the plants receive their requisite light and water, respectively.

Accordingly, it is desired to increase the efficiency of VF and similar non-traditional farming techniques by providing systems and methods that relax the requirements of space, electrical wiring, plumbing, etc.

SUMMARY

Embodiments of the present invention address and overcome one or more of the above shortcomings and drawbacks, by providing methods, systems, and apparatuses related to autonomous mobile robots for movable farming and other production systems.

According to some embodiments, a system for performing autonomous agriculture within an agriculture production environment includes one or more agriculture pods, a stationary robot system, and one or more mobile robots. The agriculture pods include one or more plants and one or more sensor modules for monitoring the plants. The stationary robot system collects sensor data from the sensor modules, performs farming operations on the plants according to an operation schedule based on the collected sensor data, and generates a set of instruction for transporting the agriculture pods within the agriculture production environment. The stationary robot system communicates the set of instructions to the agriculture pods. The mobile robots transport the agriculture pods between the stationary robot system and one or more other locations within the agriculture production environment according to the set of instructions.

In other embodiments of the present invention, a method for performing autonomous agriculture within an agriculture production environment includes detecting an agriculture pod within a stationary robot system, wherein the agriculture pod comprises (a) one or more plants and (b) one or more sensor modules for monitoring the plants. The stationary robot system collects sensor data from the sensor modules and performs farming operations on the plants according to an operation schedule based on the collected sensor data. The stationary robot system communicates instructions to a mobile robot instructing the robot to move the agriculture pod from the stationary robot system to another location within the agriculture production environment.

According to other embodiments, a method for performing autonomous agriculture within an agriculture production environment using a software application includes creating an operation schedule based on user inputs, and communicating the operation schedule to a stationary robot system within the agriculture product environment. Sensor data collected by the stationary robot system is received from one or more agriculture pods during execution of the operation schedule. Each agriculture pod comprises one or more plants. Images of the plants collected by stationary robot system during execution of the operation schedule are received. The sensor data and/or the images may then be presented to a user in the software application Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures:

FIG. 1 provides a visualization of a system for performing autonomous agriculture within an agriculture production environment, according to some embodiments;

FIG. 2C shows area of the plants and the occupied space on the land for the geometries shown in FIG. 2B;

FIG. 2D shows a comparison of various design factors for the geometries shown in FIG. 2B;

FIG. 3 shows an example stationary robot system, according to some embodiments;

DETAILED DESCRIPTION

Figure 2A:
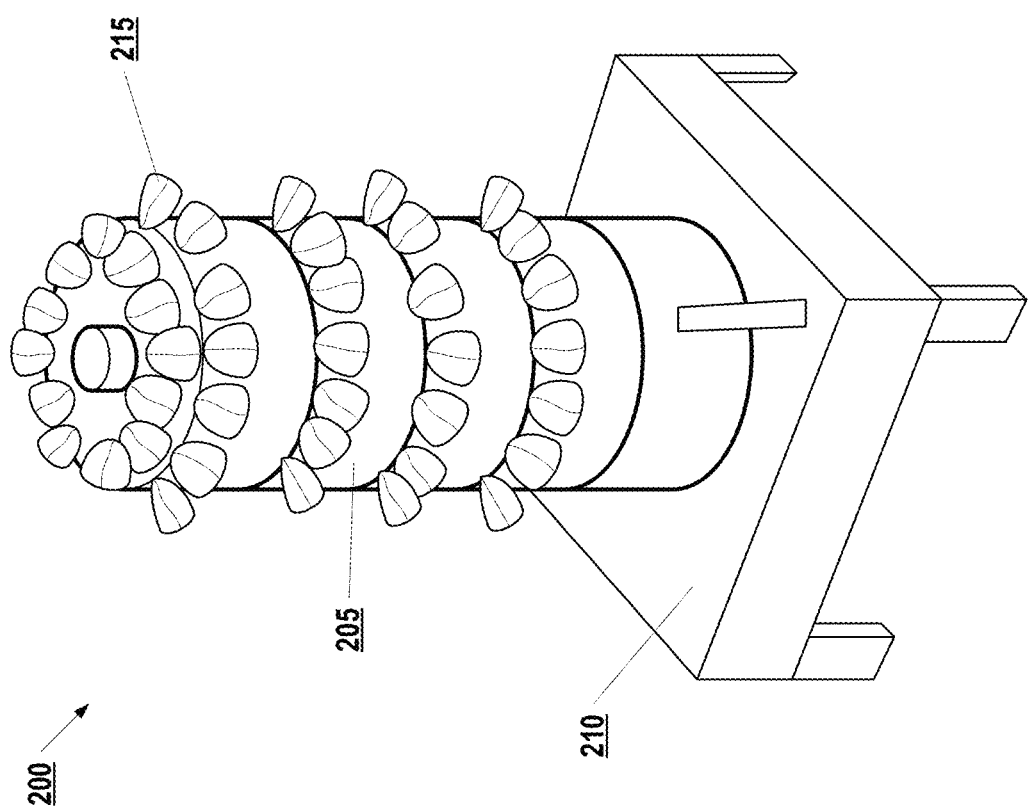
FIG. 2A shows an example of an agriculture pod, according to some embodiments.

Systems, methods, and apparatuses are described herein which relate generally to the use of autonomous mobile robots for movable production systems. As described in more detail, the present disclosure describes a mobile plant growing platform which incorporates the plant towers on a raised platform for growing the plants; wirelessly connected sensor modules for measuring plant and environment conditions (e.g., atmospheric temperature, humidity, CO2 levels, and pressure; growing medium's moisture and pH); a mobile robot unit for the transportation of the plants to the station; and a stationary robot system for performing autonomous processes on the plants (e.g., seeding, watering, harvesting, and monitoring). The techniques described herein enhance the technological state of the farming by using mobile robots, vertical-like growth of the plants, at-point automation, and closed-loop and autonomous control of these interactions for farming operations. In contrast to conventional vertical farming systems, the systems described herein could perform in outdoor or indoor conditions—even agro-climatologically difficult to practice locations—without the need of at-the-point (or location-oriented) automation.

FIG. 1 provides a visualization of a system 100 for performing autonomous agriculture within an agriculture production environment 115, according to some embodiments. The term "agriculture production environment," as used herein refers to a facility capable of storing, maintaining, and harvesting a group of plants. Agriculture production environments can vary in size. For example, a small agriculture production environment may operate in a shed structure, while a large agriculture production environment may operate in a warehouse. It should also be noted that the agriculture production environment does not only include the interior of the structure. One feature of the technology described herein is that the structures holding the plants (referred to herein as "agriculture pods") are mobile. As such, the plants can be moved outside under some scenarios to allow the plants to take advantage of favorable weather conditions.

The system 100 shown in FIG. 1 includes agriculture pods 105 that each hold one or more plants. Additionally, agriculture pods 105 include one or more sensors (not shown in FIG. 1) for monitoring the plants. A mobile robot 110 transports the agriculture pods 105 between locations within the agriculture production environment and a stationary robot system 120. When an agriculture pod 105 is in the stationary robot system 120, the stationary robot system 120 collects sensor data from the sensor modules to monitor the conditions of the plants on the agriculture pod 105. In some embodiments, the sensor modules communicate with the stationary robot system 120 using a wireless sensor network (WSN) to assess the uniformity of air temperature, humidity, and light intensity around the vicinity of the plant. Each sensor module may include, for example, temperature, moisture, and light sensors that have their signals op-amp conditioned so that they can be sent to a controller. The stationary robot system 120 may include a wireless antenna (described in further detail below) which is a node of the network systems which receives the measured data and sends it to the main hub for uploading a cloud-based application for further analysis. Moreover, ion-selective sensors ($Ca^{+2}$, $K^+$, $Mg^{+2}$, $NH^{+4}$, and $NO^{-3}$) may be added to the sensor modules to measure the nutrient solutions.

The stationary robot system 120 performs one or more farming operations on the plants according to an operation schedule. These farming operations may include, for example, one or more of seeding, watering, harvesting, or monitoring the plants. Examiner components of the stationary robot system 120 for performing these operations are described in further detail below with respect to FIG. 3. The operation schedule is a procedural plan that may indicate, for example, the time and sequence of each farming operation, as well as the agriculture pod that should be processed.

Aside from operating on the agriculture plants, the stationary robot system 120 generates instructions for transporting the agriculture pods within the agriculture production environment. Once generated, the stationary robot system 120 communicates the instructions to the mobile robot 110. In some embodiments the instructions provide detailed routing information to the mobile robot 110. In other embodiments, the instruction merely provides a destination and the mobile robot executes a routing algorithm locally within its unit to navigate to the specified location. As a simple example, the stationary robot system 120 may determine that, based on weather data and the sensor measurements gathered from a particular agriculture pod that the pod should be moved outdoors such that it receives sunlight. The stationary robot system 120 may then provide a specific location (e.g., specified as a latitude/longitude value) to the mobile robot 110, or the stationary robot system 120 may simply instruct the mobile robot 110 to take the pod outside, and allow the mobile robot 110 to decide the exact location. In addition to routing intelligence, the mobile robot 110 may also have features such as collision avoidance, edge detection, etc., that allow it to avoid obstacles and other impediments that it may encounter while navigating through the agriculture product environment.

Figure 2B:
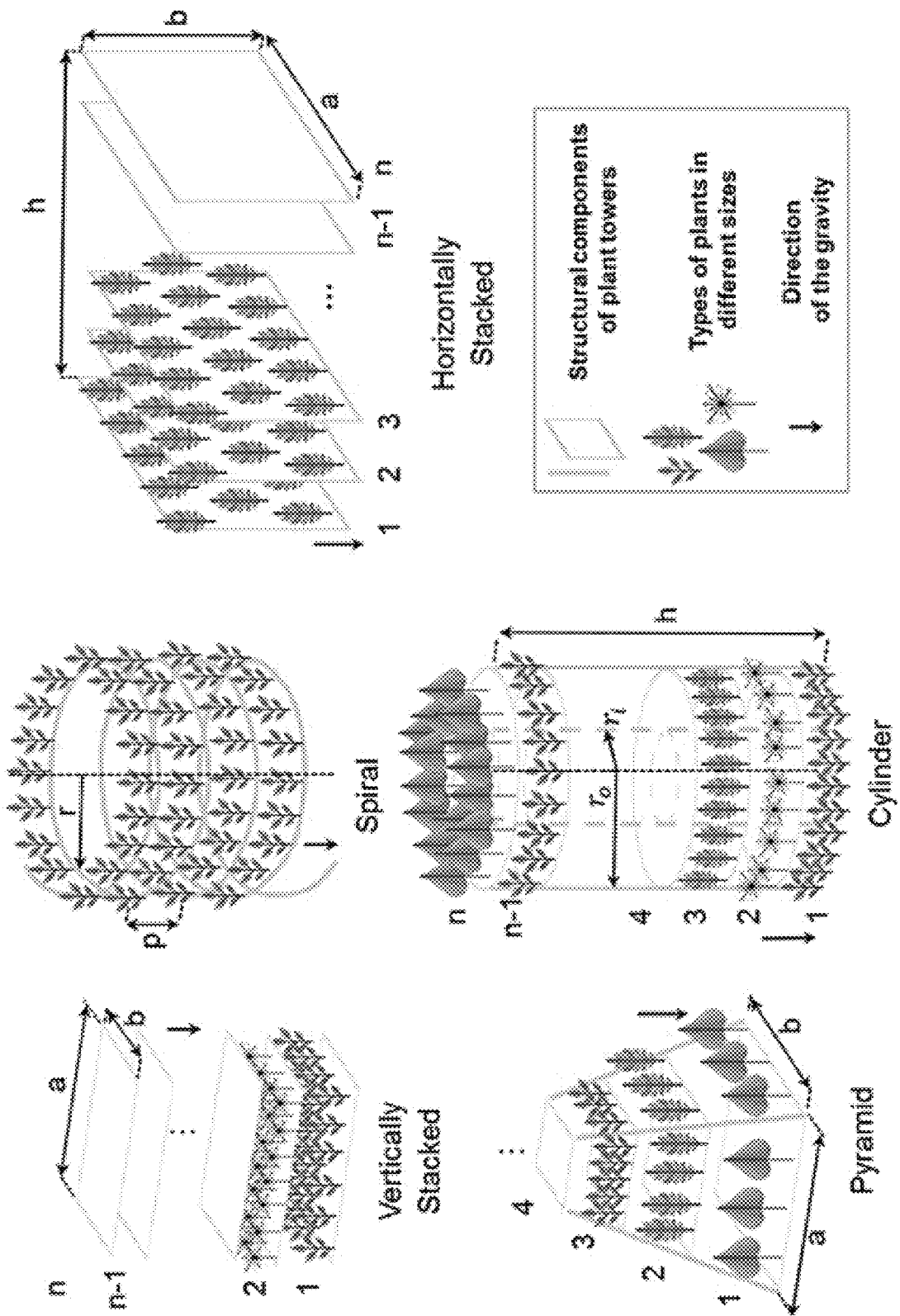
FIG. 2B shows several alternate growth geometries for plants including a vertical stacked, spiral, horizontal stacked, and pyramid geometries.

FIG. 2A shows an example of an agriculture pod 200, according to some embodiments. In this example, the agriculture pod 200 includes a multi-tiered plant tower 205 sitting on a riser 210. Each tier of the multi-tiered plant tower 205 holds one or more plants 215. The example of FIG. 2A shows a cylinder geometry; however other geometries may be used in different embodiments. FIG. 2B shows several alternate growth geometries for plants including a vertical stacked, spiral, horizontal stacked, and pyramid geometries. The area of the plants and the occupied space on the land are shown in FIG. 2C.

It can be challenging to efficiently operate the stationary robot system given the large variations in the size, position and orientation of the agriculture pods, as well as the mechanical properties of the crop. The stationary robot system addresses these challenges while maintaining the controlled growing ecosystem for the plants. Most convention indoor farming systems have similar design and automation features (e.g., vertically or horizontally stacked vertical farming—as presented in FIG. 2B). These solutions do not consider the ease of automation, operability or other important factors as given in FIG. 2D. As shown in this figures, for these particular factors, the pyramid and the cylinder surface are preferable to the vertically stacked, horizon stacked, and spiral designs.

FIG. 3 shows an example stationary robot system 300, according to some embodiments. The stationary robot system 300 is sized to allow an agriculture pod, with plants, to be enclosed within the stationary robot system 300 while allowing rooms for farming operations to be performed on the plants. In this example, two cameras 305A, 305B are used to capture images of the plants on the agriculture pod while it is located in the stationary robot system 300. In other embodiments, more or less cameras may be used. Also, the arrangement of the cameras may be varied. Robot arms 320A, 320B move along tracks 315A, 315B to perform the farming operations on the agriculture pods. The robot arms shown in FIG. 3 are conceptual examples of the types of robot arms that can be used in a stationary robot system 300. For example, in some embodiments, the robot arms may include specialized end effectors that allow operations such as pruning, watering, feeding, etc., to be performed. Moreover, although FIG. 3 shows 2 robot arms moving on a track system, it should be understood that various other robot arm configurations can be used. For example, in one embodiment, a single robot arm may be employed that can move in a spiral around an agriculture pod while it is in the stationary robot system 300.

Continuing with reference to FIG. 3, a controller computing system 310 is configured to control various components of the stationary robot system 300 (e.g., the cameras 305A, 305B; robot arms 320A, 320B, etc.). The controller computing system 310 includes a wireless antenna 310A that allows communication with remote applications or services over, for example, a local area network or the Internet. The controller computing system 310 may include additional wireless antennas that allow communication with the mobile robots tasked with transporting the agriculture pods around the agriculture production facility. The stationary robot system 300 may communicate with the robot using various network protocols known in the art including Wi-Fi, Bluetooth, Bluetooth Low Energy, or ZigBee.

In some embodiments, the mobile robot is powered by on-board batteries and the stationary robot system 300 includes a charging system for these batteries. For example, in one embodiment, the floor of the stationary robot system 300 includes an inductive charging system. Thus, as the mobile robot rolls into the stationary robot system 300 (e.g., while carrying an agriculture pod), the on-board batteries could be charged via induction.

Figure 4A:
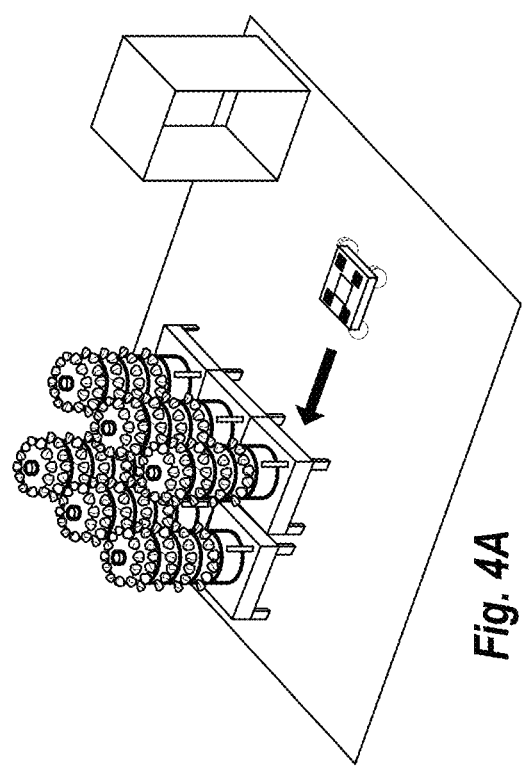
FIG. 4A illustrates a first step that the mobile robot uses to move an agriculture pod from a location into the stationary robot system.
Figure 4B:
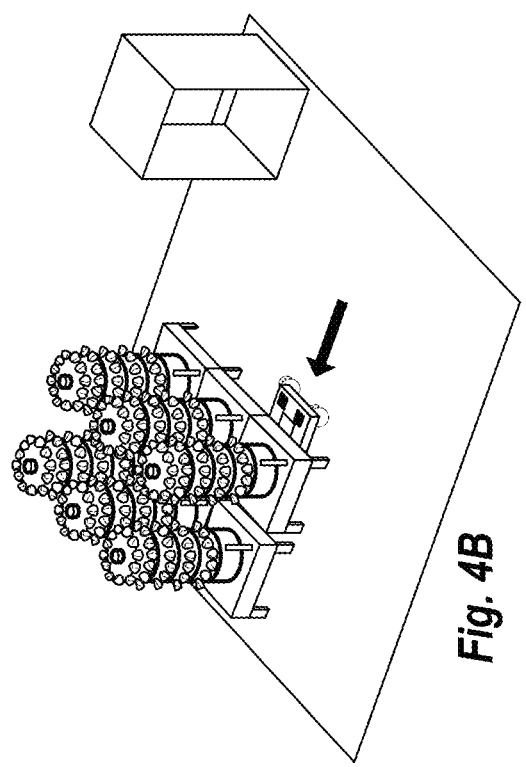
FIG. 4B illustrates a second step that the mobile robot uses to move an agriculture pod from a location into the stationary robot system.
Figure 4C:
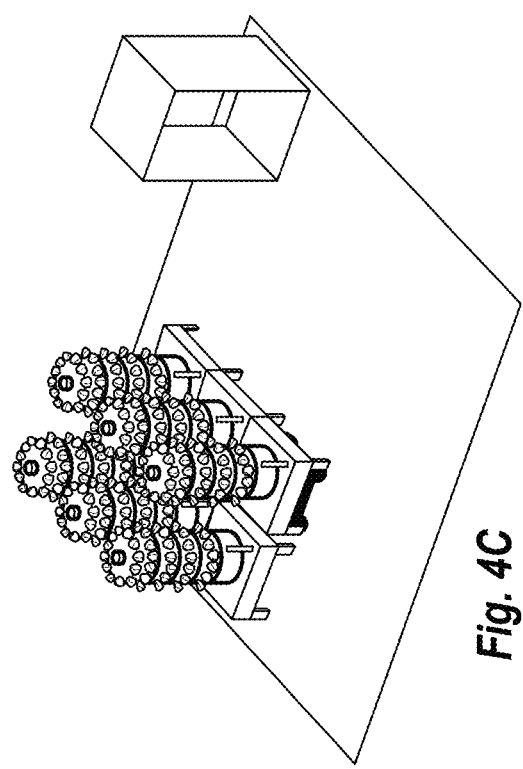
FIG. 4C illustrates a third step that the mobile robot uses to move an agriculture pod from a location into the stationary robot system.
Figure 4D:
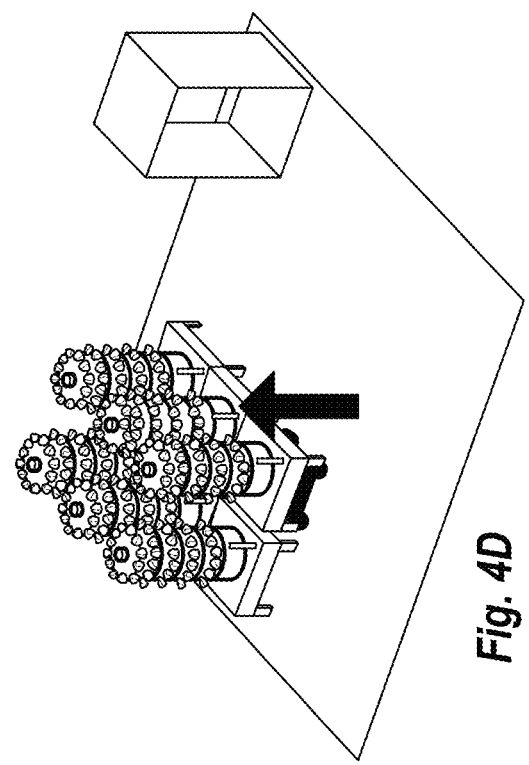
FIG. 4D illustrates a fourth step that the mobile robot uses to move an agriculture pod from a location into the stationary robot system.

FIGS. 4A-4J illustrate the series of steps that the mobile robot uses to move an agriculture pod from a location into the stationary robot system 300. This figure elaborates on the system shown in FIG. 1. Starting at FIG. 4A, the mobile robot receives instruction to move a particular agriculture pod and, in response, the mobile robot navigates through the agriculture production environment to the designated pod. In some embodiments, the mobile robot identifies the designated pod by location alone. In other embodiments, the mobile robot uses radio-frequency identification (RFID) or a similar technology to identify the agriculture pod. As shown in FIG. 4B, the mobile robot navigates under the riser of the designated agriculture pod until it is centered under the riser. The end position of the mobile robot is shown in FIG. 4C. At this point, the mobile robot can lift the riser off the ground as shown in FIG. 4D. The mobile robot can use hydraulic systems, pneumatic systems, or other lift technology generally known in the art to lift the riser.

Figure 4F:
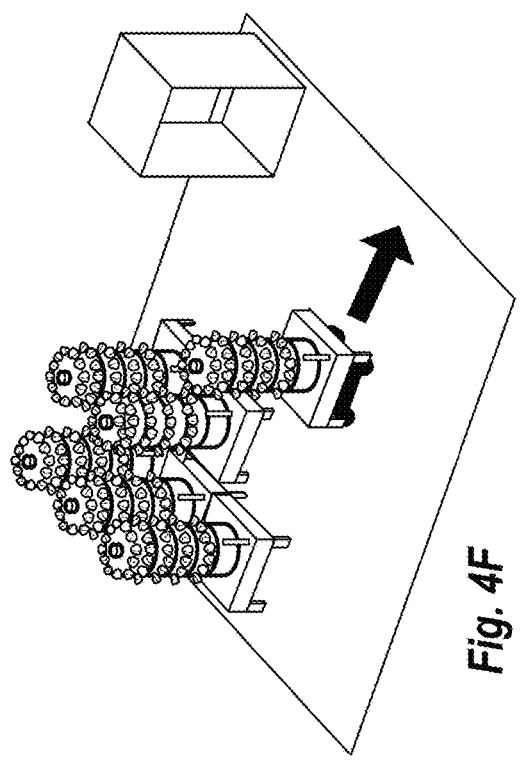
FIG. 4F illustrates a sixth step that the mobile robot uses to move an agriculture pod from a location into the stationary robot system.
Figure 4H:
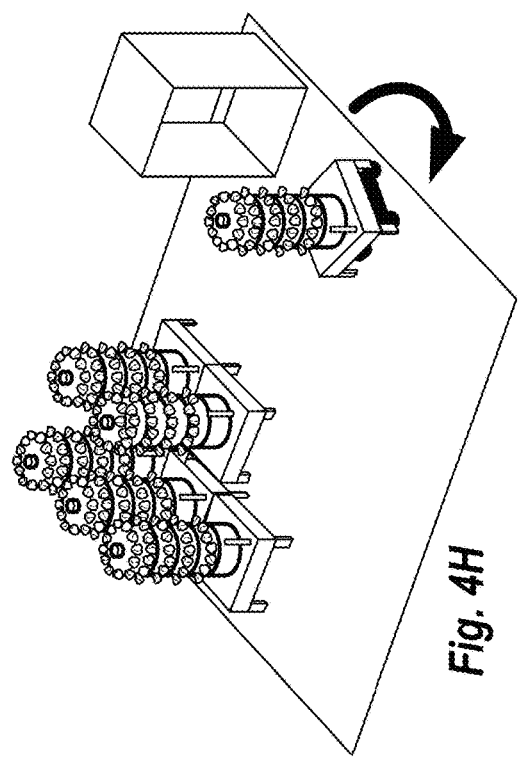
FIG. 4H illustrates a eighth step that the mobile robot uses to move an agriculture pod from a location into the stationary robot system.
Figure 4E:
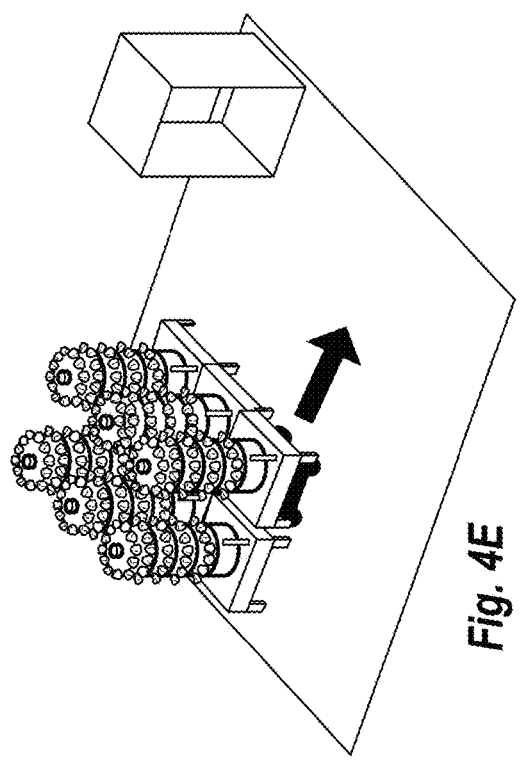
FIG. 4E illustrates a fifth step that the mobile robot uses to move an agriculture pod from a location into the stationary robot system.

At FIG. 4E, the agriculture pod has been fully lifted off the ground and the mobile robot begins navigation back to the stationary robot. Because the stationary robot has a consistent location, the mobile robot may maintain static coordinates of the stationary robot system. Alternatively, the stationary robot can provide its location when it sends the request to the mobile robot that the pod be transported. In scenarios where multiple stationary robot systems are used within a single facility, the mobile robot may send a request or broadcast a request to see which stationary robot systems are available for use. Based on response and other factors (locality), the mobile robot can select and navigate to a particular mobile robot unit.

Figure 4G:
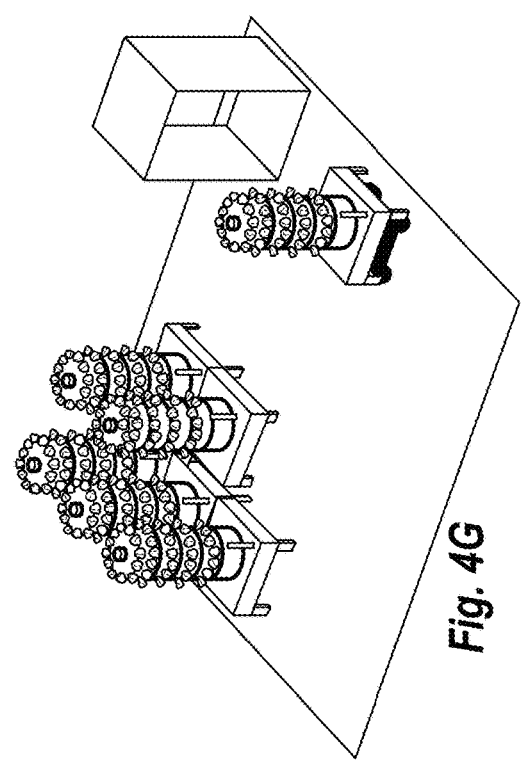
FIG. 4G illustrates a seventh step that the mobile robot uses to move an agriculture pod from a location into the stationary robot system.

As shown in FIGS. 4F and 4G, the mobile robot transports the agriculture pod to the area in front of the mobile robot unit. At this point, the mobile robot may determine whether any adjustments are needed to ensure that the agriculture pod is in the optimal or preferred position within the stationary robot system. For example, in some embodiments, the mobile robot may require the agriculture pod to be oriented in a particular way with respect to the robot arms of the stationary robot system. In this case, the mobile robot may adjust the orientation accordingly. Various techniques may be used to determine orientation. For example, in some embodiments, the mobile robot unit may include an external camera that can view the orientation of the agriculture pod as it approaches. Based on the images, the controller computer may provide instructions to the mobile computer to adjust the orientation accordingly. In other embodiments, when the mobile robot is provided with the location of the agriculture pod, it may also be provided with an orientation. The mobile robot then uses on-board logic to adjust the orientation. For example, in one embodiment, the underside of the riser may include one or more markings at various positions that indicate the front, rear, left, and right side of the rise. The mobile robot can then use an infrared scanner or other similar image capture mechanism to determine the orientation. FIG. 4H shows an example how the mobile robot can rotate the agriculture pod to adjust the orientation.

Figure 4J:
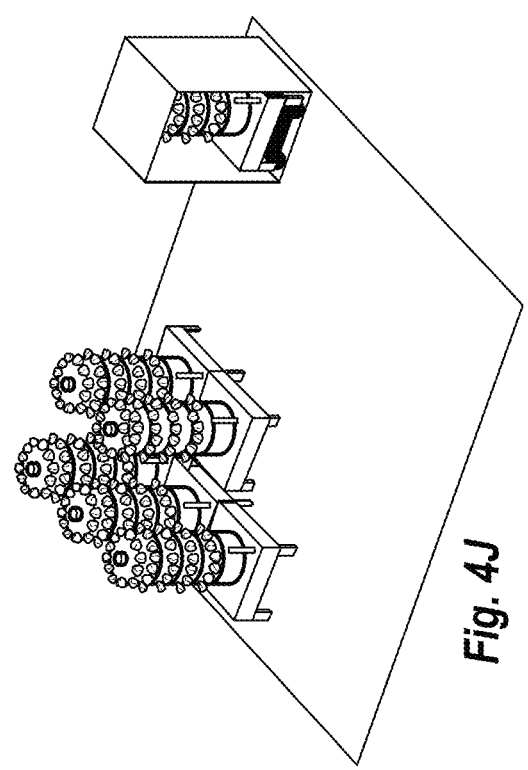
FIG. 4J illustrates a tenth step that the mobile robot uses to move an agriculture pod from a location into the stationary robot system.
Figure 4I:
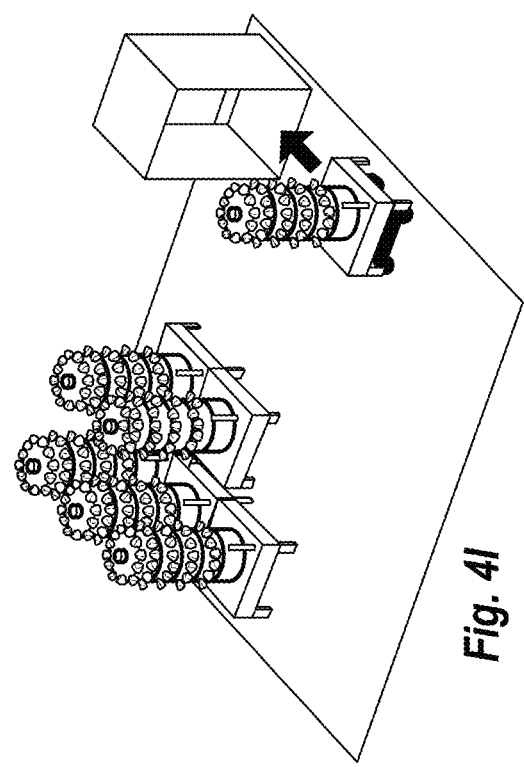
FIG. 4I illustrates a ninth step that the mobile robot uses to move an agriculture pod from a location into the stationary robot system.

Once at the desired orientation, the mobile robot moves the agriculture pod into the stationary robot system as shown in FIGS. 4I and 4J.

Figure 5:
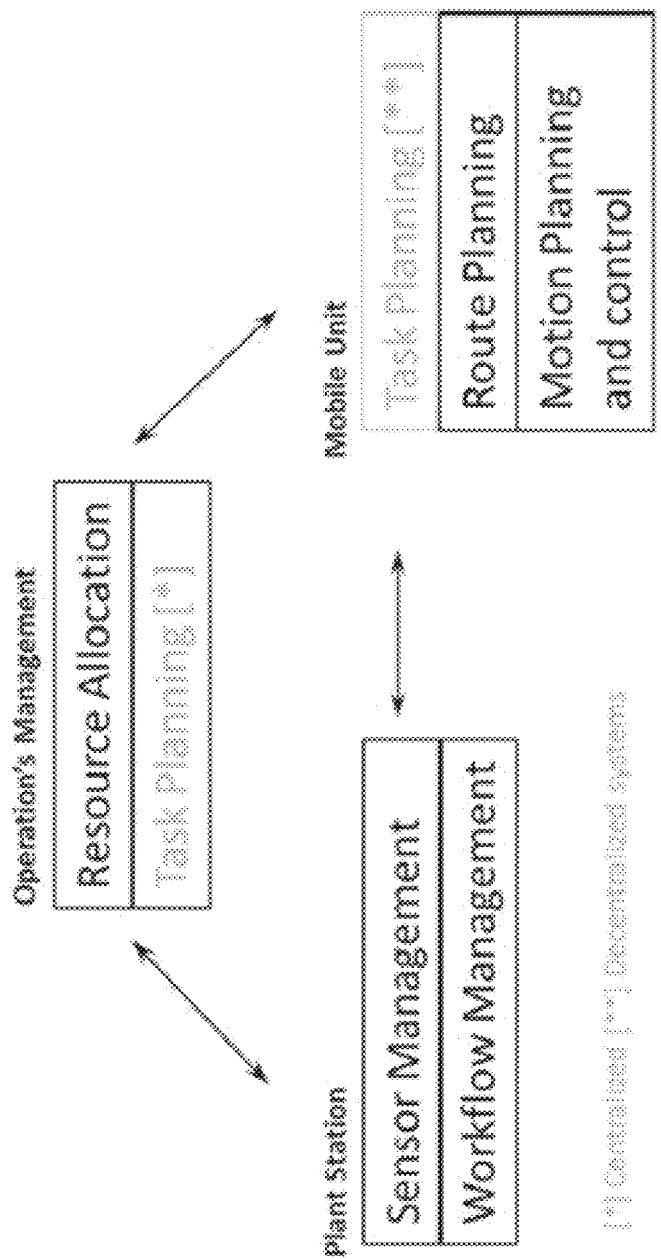
FIG. 5 provides a high-level architecture of the control system that may be employed in some embodiments.

FIG. 5 provides a high-level architecture of the control system that may be employed in some embodiments. The overarching goal of this control system is to keep the productivity in maximum level while maintaining the plant's requirements (e.g., water, fertilizer, etc.) without human intervention. One can imagine that maximizing the productivity by having hundreds of plant towers and mobile robots would be unnecessarily expensive. Intuitively, good operational management algorithms are critical for getting the work done. The mobile robot can be directed by a centralized system or is able to give the efficient decisions by itself. To achieve this, in some embodiments, route planning is used, as well as motion planning algorithms based on the need of the plant station's sensor and workflow.

Figure 6:
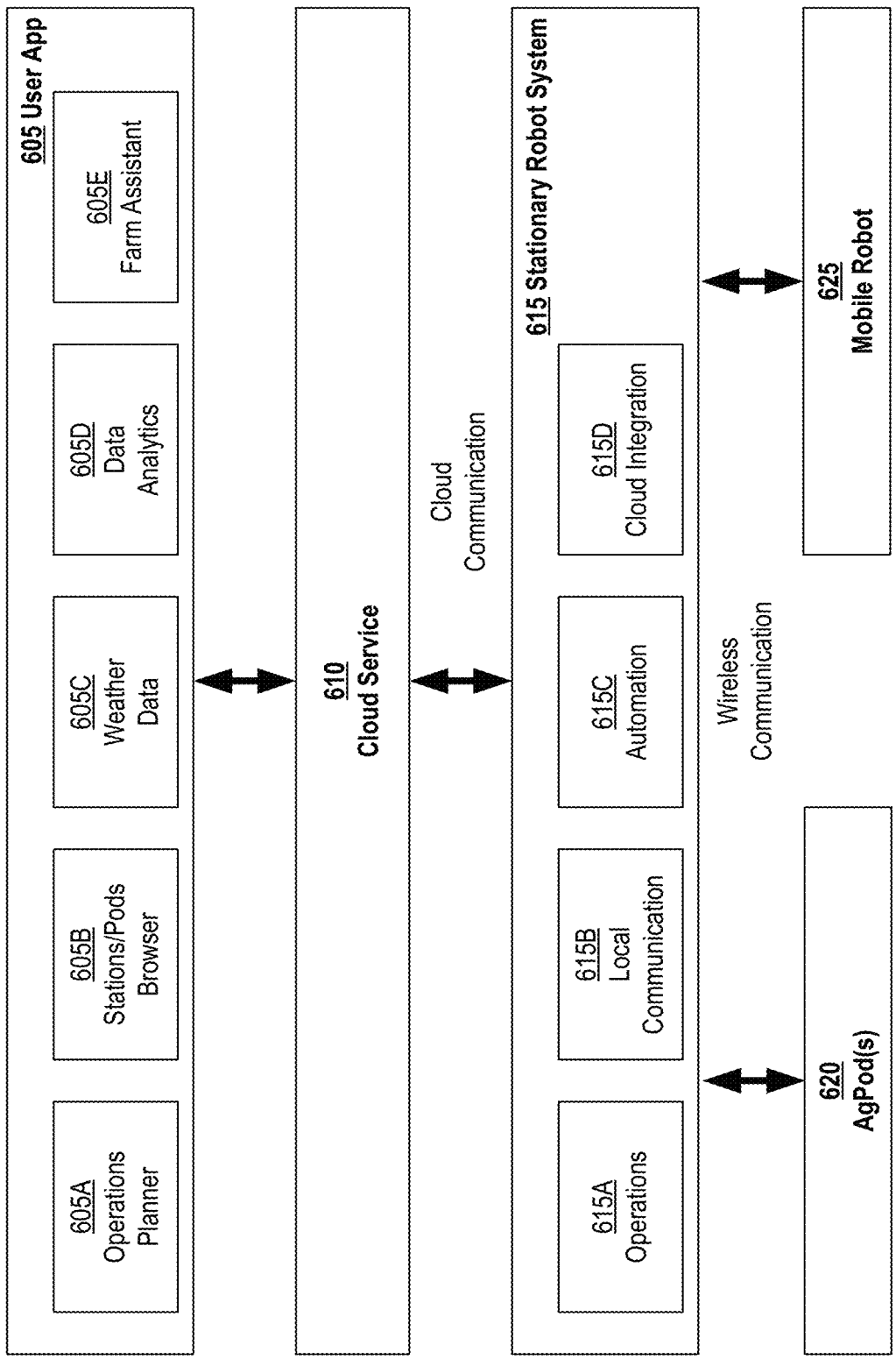
FIG. 6 shows an example autonomous agricultural pods architecture that may be used in some embodiments of the present invention.

FIG. 6 shows an example autonomous agricultural pods architecture that may be used in some embodiments of the present invention. At the lowest level, the agricultural pods 620 are physical structures where plants will grow in vertical fashion as depicted in FIG. 2A. As noted above, the agricultural pods 620 are equipped with sensors (e.g., pH, moisture, light, temperature etc.) which interchange the information to control or be controlled for the execution of farming operations such as watering, harvesting, fertilization, etc. The mobile robot 625 is responsible for the transportation of agricultural pods 620 from the assigned location to another point based on centralized or decentralized computations.

The agricultural pods 620 and the mobile robot 625 communicate wirelessly with a stationary robot system 615. The stationary robot system 615 performs the farming operations such as seeding, watering, harvesting, and monitoring by utilization of the robot arms, cameras, and other auxiliary devices. As shown in FIG. 6, the stationary robot system 615 executes a plurality of software components (e.g., via controller computing system 310). An operations component 615A is tasked with operating the robot arms, cameras, etc., to perform farming operations according to an operations schedule. A local communications component 615B facilitates communication with the agricultural pods 620 and the mobile robot 625. An automation component 615C executes a control program to manage the local system comprising the agricultural pods 620 and the mobile robot 625. Thus, for example, the automation component 615C may generate instructions for the mobile robot 625 to effectuate its movement within the production environment. Finally, a cloud integration component 615D allows the stationary robot system 615 to communicate with a cloud service 610.

The cloud service 610 collects time series data from the stationary robot system 615 (and possibly other stations) and uses that for further data analytics as well as machine learning implementations (e.g., predictions, prognostics etc.). For example, in one embodiment, the cloud service 610 executes a deep learning neural network that takes its input sensor measurements from the stationary robot system 615 and an operations plan from a user. Based on these inputs, the cloud service generates updates to the operations plan that can then be communicated to the stationary robot system 615 for execution.

In the example of FIG. 6, a user app 605 allows a user to communicate with the cloud service 610. The user app 605 includes an operations planner 605A component that allows the user to create, view, and modify operation plans. These plans are then used to derive an operations schedule to be executed by the stationary robot system 615 (and any other stationary robot systems under the user's control). In some embodiments, the operation plan and the operation schedule are identical. That is the user explicitly provides the times, etc., for performing farming operations. In other embodiments, the operation schedule is derived from an operation plan. As a simple example, if the user specifies that plants must be watered once a day in the mornings, the user app 605 or the cloud service 610 may create an operation schedule to water the agricultural pods 620 every morning at 5:00 AM.

The stations/pod browser 605B allows the user to view data on the conditions of the stationary robot system 615 and the agricultural pods 620. For example, in one embodiment, the user may be presented with images of the plants on the agricultural pods 620, sensor measurements, and/or analytics derived from the sensor measurements. Weather data 605C may be presented to the user so that the user can make changes to the operations plan (e.g., move the agricultural pods 620 outdoors on sunny days). A data analytics component 605D may supplement the analytics provided by the cloud service 610 and allow the user to create plots, derive custom analytic values, etc. Finally a farm assistant component 605E provides suggestions to the user on how to change the operations plan. For example, the farm assistant component 605E may recommend adjustments to the feeding schedule based on the sensor measurements and operation plans executed in other facilities under similar scenarios.

Figure 7:
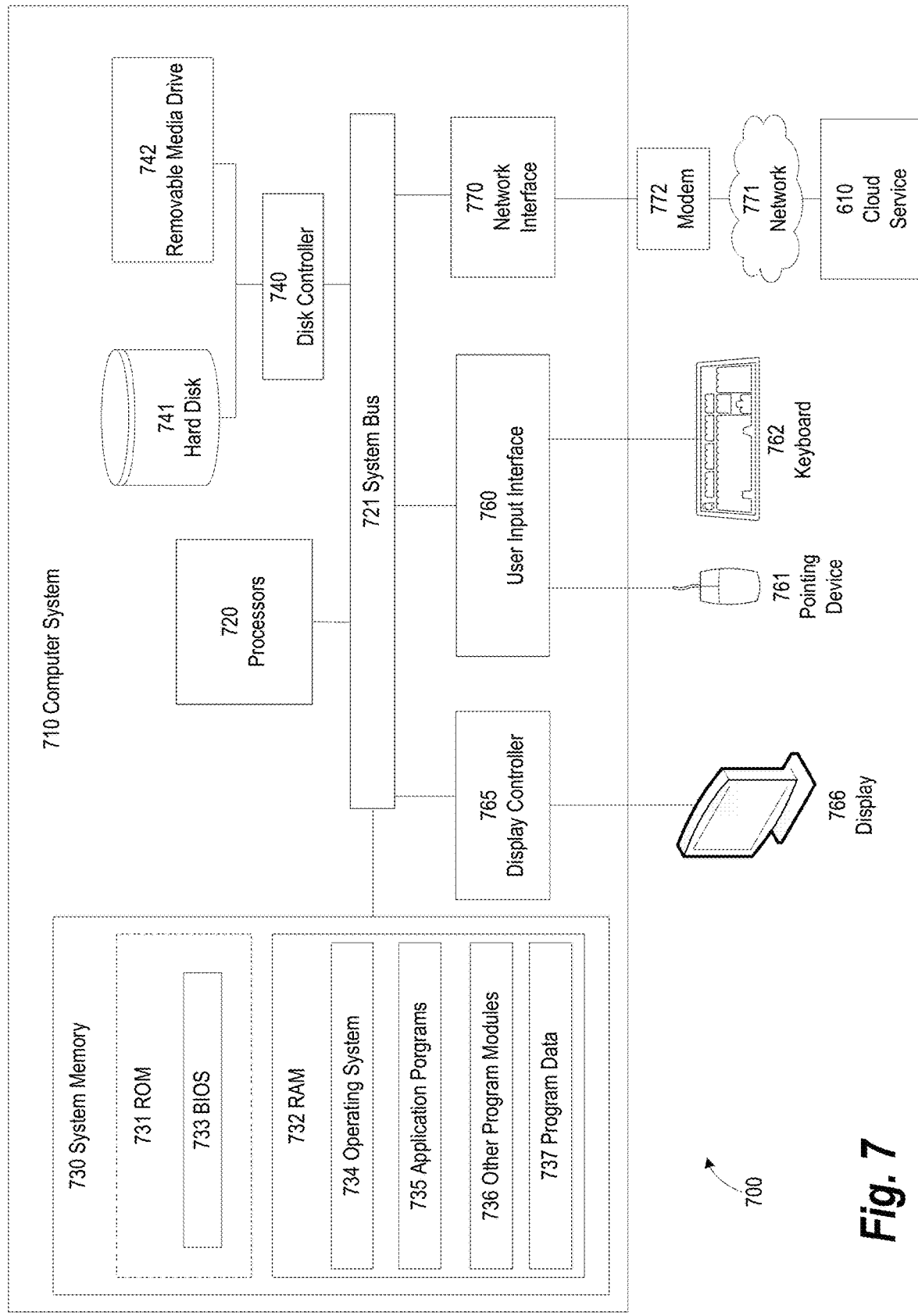
FIG. 7 illustrates an exemplary computing environment within which may be used to implement the controller computer of the stationary robot system.

FIG. 7 illustrates an exemplary computing environment 700 within which may be used to implement the controller computer of the stationary robot system. The computing environment 700 includes computer system 710, which is one example of a computing system upon which embodiments of the invention may be implemented. Computers and computing environments, such as computer system 710 and computing environment 700, are known to those of skill in the art and thus are described briefly herein.

As shown in FIG. 7, the computer system 710 may include a communication mechanism such as a system bus 721 or other communication mechanism for communicating information within the computer system 710. The computer system 710 further includes one or more processors 720 coupled with the system bus 721 for processing the information. The processors 720 may include one or more central processing units (CPUs), graphical processing units (GPUs), or any other processor known in the art.

The computer system 710 also includes a system memory 730 coupled to the bus 721 for storing information and instructions to be executed by processors 720. The system memory 730 may include computer readable storage media in the form of volatile and/or nonvolatile memory, such as read only memory (ROM) 731 and/or random access memory (RAM) 732. The system memory RAM 732 may include other dynamic storage device(s) (e.g., dynamic RAM, static RAM, and synchronous DRAM). The system memory ROM 731 may include other static storage device(s) (e.g., programmable ROM, erasable PROM, and electrically erasable PROM). In addition, the system memory 730 may be used for storing temporary variables or other intermediate information during the execution of instructions by the processors 720. A basic input/output system (BIOS) 733 contains the basic routines that help to transfer information between elements within computer system 710, such as during start-up, may be stored in ROM 731. RAM 732 may contain data and/or program modules that are immediately accessible to and/or presently being operated on by the processors 720. System memory 730 may additionally include, for example, operating system 734, application programs 735, other program modules 736 and program data 737. The application programs 735 may include, for example, the one or more executable applications corresponding to the components 615A, 615B, 615C, 615D shown in FIG. 6.

The computer system 710 also includes a disk controller 740 coupled to the system bus 721 to control one or more storage devices for storing information and instructions, such as a hard disk 741 and a removable media drive 742 (e.g., compact disc drive, solid state drive, etc.). The storage devices may be added to the computer system 710 using an appropriate device interface (e.g., a small computer system interface (SCSI), integrated device electronics, Universal Serial Bus (USB), or FireWire).

The computer system 710 may also include a display controller 765 coupled to the bus 721 to control a display 766, such as a liquid crystal display (LCD), for displaying information to a computer user tasked with programming or maintaining the controller computing system of the stationary robot system. The computer system includes an input interface 760 and one or more input devices, such as a keyboard 762 and a pointing device 761, for interacting with a computer user and providing information to the processors 720. The pointing device 761 may be, for example, a mouse or a pointing stick for communicating direction information and command selections to the processors 720 and for controlling cursor movement on the display 766. The display 766 may provide a touch screen interface which allows input to supplement or replace the communication of direction information and command selections by the pointing device 761.

The computer system 710 may perform a portion or all of the processing steps of embodiments of the invention in response to the processors 720 executing one or more sequences of one or more instructions contained in a memory, such as the system memory 730. Such instructions may be read into the system memory 730 from another computer readable medium, such as a hard disk 741 or a removable media drive 742. The hard disk 741 may contain one or more datastores and data files used by embodiments of the present invention. Datastore contents and data files may be encrypted to improve security. The processors 720 may also be employed in a multi-processing arrangement to execute the one or more sequences of instructions contained in system memory 730. In alternative embodiments, hardwired circuitry may be used in place of or in combination with software instructions. Thus, embodiments are not limited to any specific combination of hardware circuitry and software.

As stated above, the computer system 710 may include at least one computer readable medium or memory for holding instructions programmed according to embodiments of the invention and for containing data structures, tables, records, or other data described herein. The term "computer readable medium" as used herein refers to any medium that participates in providing instructions to the processor 720 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 741 or removable media drive 742. Non-limiting examples of volatile media include dynamic memory, such as system memory 730. Non-limiting examples of transmission media include coaxial cables, copper wire, and fiber optics, including the wires that make up the bus 721. Transmission media may also take the form of acoustic or light waves, such as those generated during radio wave and infrared data communications.

When used in a networking environment, computer system 710 may include modem 772 for establishing communications over a network 771 with the cloud service 610 (see FIG. 6). Modem 772 may be connected to bus 721 via user network interface 770, or via another appropriate mechanism. Network 771 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 710 and other computers (e.g., cloud service 610). The network 771 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 771.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Unless stated otherwise as apparent from the following discussion, it will be appreciated that terms such as "applying," "generating," "identifying," "determining," "processing," "computing," "selecting," or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention. An executable application, as used herein, comprises code or machine readable instructions for conditioning the processor to implement predetermined functions, such as those of an operating system, a context data acquisition system or other information processing system, for example, in response to user command or input.

An executable application is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A "graphical user interface" (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) the element is expressly recited using the phrase "means for."

We claim:

1. A system for performing autonomous agriculture within an agriculture production environment, the system comprising:
   one or more agriculture pods comprising (a) one or more plants in a multi-tiered plant tower elevated by a riser and (b) one or more sensor modules for monitoring the plants;
   a stationary robot system configured to:
      collect sensor data from the sensor modules,
      perform one or more farming operations on the plants according to an operation schedule based on the collected sensor data,
      generate a first set of instructions for transporting the agriculture pods within the agriculture production environment, the first set of instructions including a destination, and
      communicate the first set of instructions to one or more mobile robots; and
   based on the first set of instructions, the one or more mobile robots configured to raise the riser of the multi-tiered plant tower and execute a routing algorithm so as to determine a route, and transport the agriculture pods along the route to the destination in the first set of instructions that is within the agriculture production environment,
   wherein the one or more mobile robots are further configured to rotate the agriculture pods so as to adjust respective orientations of the agriculture pods based on a position of the stationary robot system.

2. The system of claim 1, further comprising:
   a software application executing remotely from the agriculture production environment and configured to:
      collect the sensor data from the stationary robot system, and
      present the sensor data to one or more users, and
      update the operation schedule based on one or more commands received from the users.

3. The system of claim 1, wherein each sensor module comprises a temperature sensor, a moisture sensor, and a light sensor.

4. The system of claim 1, wherein the sensor module further comprises an ion-selective sensor.

5. The system of claim 1, wherein each sensor module further comprises a wireless networking antenna for communicating with the stationary robot system.

6. The system of claim 1, wherein each agriculture pod further comprises the plant tower holding the plants according to a particular growth geometry and a riser elevating the plant tower off the ground.

7. The system of claim 6, wherein the particular growth geometry is a spiral geometry.

8. The system of claim 6, wherein the particular growth geometry is a pyramid geometry.

9. The system of claim 6, wherein the particular growth geometry is a cylinder geometry.

10. The system of claim 6, wherein the mobile robot transports the agriculture pod by (a) moving under the riser, (b) increasing the height of the mobile robot until the riser is not in contact with the ground, (c) transporting the agriculture pod to a desired location within the agriculture production environment, and (d) decreasing the height of the mobile robot until the riser is in contact with the ground at the desired location.

11. The system of claim 1, wherein the farming operations comprise one or more of seeding, watering, harvesting, or monitoring the plants.

12. The system of claim 1, wherein the mobile robot locally executes a route planning algorithm to determine routes for moving within the agriculture production environment based on the first set of instructions.

13. The system of claim 1, wherein the stationary robot system comprises one or more robot arms for manipulating the plants in the agriculture pods to perform the farming operations.

14. The system of claim 1, wherein the stationary robot system comprises one or more cameras for capturing images of the plants in the agriculture pods.

15. The system of claim 14, wherein the images are communicated to one or more remote software applications for display to a user.

16. A method for performing autonomous agriculture within an agriculture production environment, the method comprising:
   detecting an agriculture pod within a stationary robot system, wherein the agriculture pod comprises (a) one or more plants in a multi-tiered plant tower elevated by a riser and (b) one or more sensor modules for monitoring the plants;

collecting, by the stationary robot system, sensor data from the sensor modules;

performing, by the stationary robot system one or more, farming operations on the plants according to an operation schedule based on the collected sensor data;

communicating, by the stationary robot system, one or more instructions to a mobile robot instructing the robot to raise the riser of the multi-tiered plant tower so as to move the agriculture pod from the stationary robot system to another location within the agriculture production environment, the one or more instructions comprising a destination;

based on the one or more instructions, the one or more mobile robots executing a routing algorithm so as to determine a route, and the one or more mobile robots transporting the agriculture pod along the route to the destination in the first set of instructions that is within the agriculture production environment; and based on a position of the stationary robot system, the one or more mobile robots rotating the agricultural pod so as to adjust an orientation of the agriculture pod.

17. The method of claim 16, further comprising:

communicating, by the stationary robot system, the collected sensor data to a remote software application; and in response to communicating the sensor data, receiving updates to the operation schedule.

18. The method of claim 16, further comprising:

receiving, by the stationary robot system, weather forecast data; and updating one or more of the operation schedule or the instructions communicated to the mobile robot based on the weather forecast data.

19. The method of claim 16, further comprising:

capturing, by the stationary robot system, one or more images of the plants while executing the operation schedule; and communicating, by the stationary robot system, the images to a remote software application.

* * * * *